United States Patent
Eipper et al.

(10) Patent No.: US 6,286,896 B1
(45) Date of Patent: Sep. 11, 2001

(54) BODY STRUCTURE WITH AT LEAST ONE TRANSVERSE CONNECTION AND METHOD OF MAKING SAME

(75) Inventors: Konrad Eipper, Rottenburg; Sven Hicken, Munich; Stephan Huschka, Dendendord, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/188,173

(22) Filed: Nov. 9, 1998

(30) Foreign Application Priority Data

Nov. 7, 1997 (DE) ................................................ 197 49 294

(51) Int. Cl.⁷ .................................................. B60R 27/00
(52) U.S. Cl. ........................................... 296/189; 296/191
(58) Field of Search ................................. 296/188, 189, 296/191, 193, 195, 203.04, 203.01, 181

(56) References Cited

U.S. PATENT DOCUMENTS

| | | | |
|---|---|---|---|
| 3,754,746 | * 8/1973 | Thiele | 267/151 |
| 3,790,365 | 2/1974 | Niebylski et al. | 75/20 F |
| 3,797,873 | * 3/1974 | Cook | 293/133 |
| 3,834,881 | 9/1974 | Niebylski et al. | |
| 3,940,262 | * 2/1976 | Niebylski et al. | 75/414 |
| 4,174,014 | * 11/1979 | Bjorksten | 180/68.5 |
| 5,054,402 | * 10/1991 | Brassell | 296/100.02 X |
| 5,150,944 | * 9/1992 | Yoshida et al. | 296/188 |
| 5,507,405 | * 4/1996 | Thomas et al. | 296/181 X |
| 5,772,276 | * 6/1998 | Fetz et al. | 296/181 |
| 5,788,322 | * 8/1998 | Wolf et al. | 296/188 |

FOREIGN PATENT DOCUMENTS

| | | |
|---|---|---|
| 8706593.2 | 10/1987 | (DE) . |
| 4243186A1 | 6/1994 | (DE) . |
| 4318540A1 | 12/1994 | (DE) . |
| 195 09 018 | 11/1995 | (DE) . |
| 4430920C1 | 3/1996 | (DE) . |
| 19546352A1 | 6/1996 | (DE) . |
| 196 42 821 | 6/1997 | (DE) . |
| 0 798 062 | 10/1997 | (EP) . |
| 0 900 714 | 3/1999 | (EP) . |
| 2 657 319 | 7/1991 | (FR) . |
| 2657319A1 | 7/1991 | (FR) . |
| 57-144775 | 9/1982 | (JP) . |
| 62-148477 | 9/1987 | (JP) . |
| 06-64559 | 3/1994 | (JP) . |
| 06-206230 | 7/1994 | (JP) . |
| 8-13670 | 1/1996 | (JP) . |
| 09-220984 | 8/1997 | (JP) . |
| WO 92/03582 | 3/1992 | (WO) . |

OTHER PUBLICATIONS

Japanese Office Action dated Nov. 16, 2000 w/ English–language translation.

* cited by examiner

Primary Examiner—Joseph D. Pape
Assistant Examiner—Jason Morrow
(74) Attorney, Agent, or Firm—Crowell & Moring, L.L.P.

(57) ABSTRACT

A self-supporting structure for a motor vehicle with at least one transverse connection is provided. At least one transverse connection for stiffening the body structure is provided which is made in one piece from a dimensionally stable light weight metal or plastic foam and extends over the entire width of the body structure.

39 Claims, 1 Drawing Sheet

BODY STRUCTURE WITH AT LEAST ONE TRANSVERSE CONNECTION AND METHOD OF MAKING SAME

BACKGROUND AND SUMMARY OF THE INVENTION

This application claims the priority of German application 197 49 294.0-42, filed in Germany Nov. 7, 1997, the disclosure of which is expressly incorporated by reference herein the disclosure of which is expressly incorporated by reference herein.

The invention relates to a self-supporting body structure for a motor vehicle with at least one transverse connection to stiffen the body structure.

Connecting elements are known from German published application DE 43 18 540 A1 that consist of a supporting aluminum sheet and an aluminum foam layer for additional support of the sheet metal. A partition between the engine compartment and the interior is provided as a special embodiment, with noise absorption tasks being assigned to the metal foam.

French Patent FR 2,657,319 teaches a nonsupporting partition for a motor vehicle body which is coated with a foam layer on one side.

German Patent DE 44 30 920 C1 also teaches a transverse connection in a motor vehicle body in the form of a passenger compartment firewall. It consists essentially of a curved sheet metal section mounted in the transverse direction of the vehicle onto which the shaped body made of a light weight metal foam, especially aluminum foam, is mounted, fitting the shape of the sheet metal section.

A reinforcing element for a motor vehicle body is known from utility model DE 87 06 593 U1, said element being designed as a hollow section located in the transverse direction of the body, made in particular of sheet metal or fiber-reinforced plastic. The cavity of the reinforcing element is filled with an expanded clay/synthetic resin supporting core which serves both to increase the strength and to avoid corrosion as well as to improve the vibrational behavior in such a reinforcing element.

A bumper element in a frame structure of a motor vehicle body is known from German Patent 195 46 352 A1, said element being inserted into a hollow lengthwise member element, especially an aluminum section. A bumper element of this kind is foamed either in the lengthwise member element or in a separate mold and, in both cases, fitted as a compact block exactly into the lengthwise member element.

A flat metal-foam semifinished product is also known from U.S. Pat. No. 3,834,881 in which intermediate layers of metal, plastic, or paper are inserted into the metal foam transversely to the intended main stress direction. As a result, under compressive stress, a greater deformation of a part made of such a material is to be achieved. In particular, shear fractures are to be avoided in brittle alloys.

German published application DE 42 43 186 A1 teaches a modular motor vehicle body that has a passenger compartment module manufactured in one piece from a large stamped part, preferably a glass-fiber-reinforced polyester resin.

A goal of the invention on the other hand is to provide a body structure of the species recited at the outset that allows a high transverse rigidity by simple means and is designed with reduced weight.

This goal is achieved according to the invention by the fact that the transverse connection is made in one piece as a flat transverse wall with energy absorbing ability in the lengthwise direction of the vehicle, from a dimensionally stable light weight metal or plastic foam and extends over the entire width of the body structure. The transverse connection is made as a supporting element exclusively from light weight metal or plastic foam, and can be foamed during manufacture in nearly any desired shape. Costly manufacture in the form of a sandwich element is no longer necessary for such a transverse connection, since the dimensionally stable design of a foam transverse connection ensures that the transverse connection can assume an independent supporting function. Moreover, a suitable manufacturing method can be achieved such that the foam material of the transverse connection has a largely closed and smooth surface structure so that an additional surface coating can also be eliminated. The energy absorption effect is achieved in particular by a suitable design of the foam structure and the wall thickness of the transverse connection. Thus, a transverse connection of this kind not only permits a transverse stiffening of the body structure but also constitutes a safety element within the vehicle in the event of a front-end collision; for example objects hurled through the vehicle can be caught by such a transverse connection.

In one embodiment of the invention, the transverse connection is placed in a frame made in particular from the material of the transverse connection for securing it to the body structure, with the frame having at least one fastening section for releasable or nonreleasable mounting on the body structure. As a result, the transverse connection can be secured to the body structure especially simply by means of the frame so that no separate fastening section need be provided as part of the transverse connection.

In another embodiment of the invention, the transverse connection is provided with at least one nonsupporting cover layer, especially made of the material of the transverse connection. With such a cover layer, the transverse connection can be adapted to any desired surface requirements, with the manufacture of the cover layer from the material of the transverse connection producing an especially favorable joining situation between the transverse connection and the cover layer.

In another embodiment of the invention, the flat transverse wall is located in he vicinity of a fuel tank and is designed as a motor vehicle tank covering in the lengthwise and vertical directions of the vehicle. Since the tank, an especially sensitive structure within a motor vehicle, requires special protective measures, a transverse connection designed as a flat transverse wall is provided as a tank cover which additionally, and in particular, reinforces the body structure in the vicinity of the fuel tank. As a result of the flexible foam design of this transverse connection, consideration can be given to the particular shape of a fuel tank.

Preferred embodiments of the invention are especially adapted for use in open top convertible vehicles.

Other objects, advantages and novel features of the present invention will become apparent from the following detailed description of the invention when considered in conjunction with the accompanying drawings.

DETAILED DESCRIPTION OF THE DRAWINGS

Figure 1:
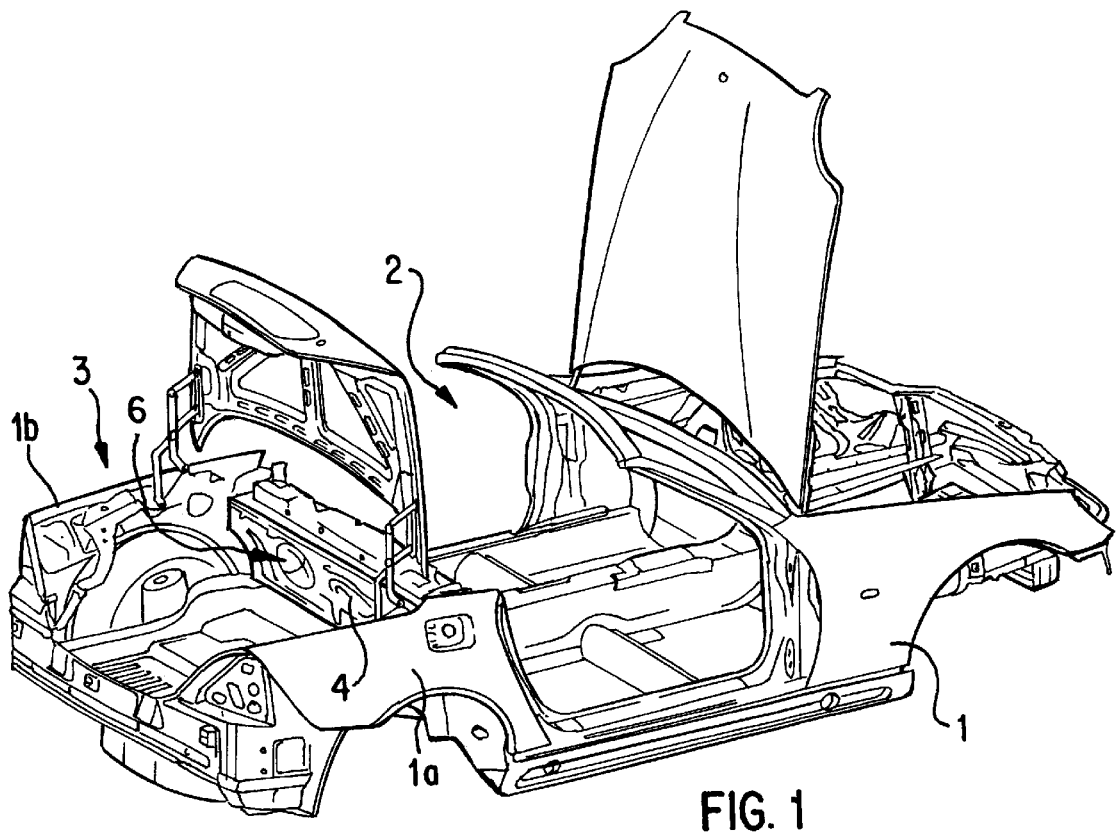
FIG. 1 shows a body structure with a transverse wall according to the invention between the trunk and the interior of the vehicle.

FIG. 1 shows a body structure 1 for an open motor vehicle which has a body area designed as a vehicle interior 2 and a body area designed as trunk 3. These two body areas are separated from one another by a transverse connection in the form of a transverse wall 4 between the two body side walls 1a and 1b. Transverse wall 4 is made in one piece from aluminum foam and has a width that roughly corresponds to the space between the two side walls 1a and 1b. Transverse wall 4 is also connected permanently with side walls 1a and 1b by means of a mount, not shown. As a result, there is a rigid connection between the two side parts. Similarly, the body structure according to the invention can also be used in closed automobiles.

Figure 2:
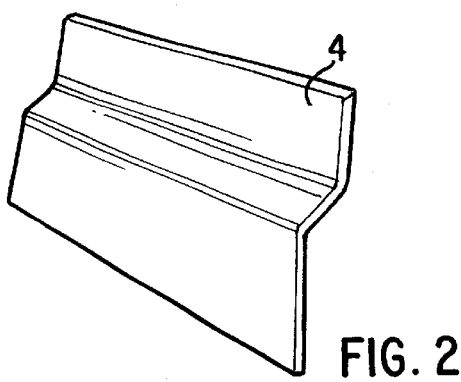
FIG. 2 shows a transverse connection according to the invention in the form of a transverse wall in detail.

In FIG. 2, this transverse wall is once again shown schematically, indicating that transverse wall 4 can be made not only as a flat plate but also with a complex three-dimensional shape. In the present embodiment, transverse wall 4 not only forms a transverse connection for reinforcing body structure 1 but also forms a rear wall for the interior 2 and a rear covering for a fuel tank of the motor vehicle, not shown. Therefore, transverse wall 4 has projections and recesses, not shown in greater detail, which are adapted to the volume of the fuel tank and to the safety requirements in the vehicle. In particular, special emphasis is placed on reinforcing body structure 1 in the transverse direction and on covering the fuel tank as well as the vehicle interior at the rear. It turns out to be especially advantageous in this connection for transverse wall 4 to be foamed from light weight metal foam in a nearly infinitely variable shape, so that, by virtue of the manufacturing method of the foam structure of the transverse wall 4 by powder metallurgy or melting metallurgy, an external surface can be achieved that largely consists of closed foam pores, so that the use of additional cover layers is not necessary.

In the case of a side collision, transverse wall 4 absorbs impact energy by deformation, in the same way as, in the case of a head-on collision, it catches objects flung forward though the trunk and absorbs their kinetic energy by deformation.

Figure 3:
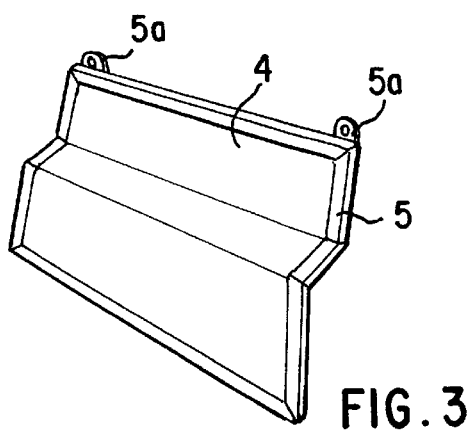
FIG. 3 shows a transverse wall according to FIG. 2 which is mounted in a mounting frame.

A modified embodiment of a transverse connection according to the invention is shown in FIG. 3. A transverse wall 4 made in one piece from aluminum foam has a mounting frame 5 into which transverse wall 4 is inserted shapewise and by which transverse wall 4 can be connected especially simply with body structure 1. For this purpose, mounting frame 5 has fastening tabs 5a each of which is traversed by a bolt element for releasable shapewise mounting to body structure 1.

In an embodiment that is not shown, a transverse connection is designed that consists of a light weight metal or plastic foam, into which a plurality of mounting elements in the form of mounting bushings are integrated by foaming around them. Such mounting bushings are already foamed in a nonreleasable fashion and shapewise in the manufacture of the transverse connection, with the free bushing cross section remaining accessible of course. Mounting screws or bolts can be inserted into the mounting bushings so that high torques can be applied to the respective screwing locations of the transverse connection despite its manufacture as a foamed part.

In another embodiment, not shown, a similar transverse wall is provided as a rear shelf and has on its surface, visible from outside, an additional cover layer made of an aluminum foil. A cover layer of this kind produces a more flexible surface and can be made in modified form from plastic or another material. The advantage of a cover layer made of the same material as the foamed transverse wall is that the bonded element thus produced can be recycled without considerable expense in the resource recycling process. This is also significant in the case of a transverse wall 4 that must be inserted if possible into a mounting frame 5 made of the same material.

It is also contemplated by the invention to have mounting tabs foamed in one piece as well as integrated reinforcing sections provided as elements of a transverse connection contained in the body structure. In addition, manufacture from any foamable material is possible, with metal foams being preferred because of their more favorable strength properties by comparison with plastic foams. In addition, any nonsupporting cover layers made of any material can be applied to such a transverse connection without such transverse connections being removed from the body structure according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Self-supporting body structure for a passenger vehicle comprising a passenger vehicle body structure having side walls and at least one transverse connection for reinforcing the body structure, wherein the transverse connection comprises a flat transverse wall connected to the side walls, the transverse connection has energy-absorbing ability in the lengthwise direction of the vehicle, the transverse connection is comprised of a dimensionally stable, lightweight material selected from the group of a metal foam and a plastic foam, and the transverse connection extends over the entire width of the body structure.

2. Body structure according to claim 1, wherein the transverse connection is mounted to the body structure in a frame comprising the same material as the transverse connection.

3. Body structure according to claim 1, wherein the transverse connection is provided with at least one cover layer, the cover layer comprising the same material as the transverse connection, wherein the cover layer does not substantially support the body structure.

4. Body structure according to claim 2, wherein the transverse connection is provided with at least one cover layer, the cover layer comprising the same material as the transverse connection, wherein the cover layer does not substantially support the body structure.

5. Body structure according to claim 1, wherein the transverse connection is located approximately adjacent to a fuel tank, wherein the transverse connection is a fuel tank cover in the lengthwise and vertical directions of the vehicle.

6. Body structure according to claim 2, wherein the transverse connection is located approximately adjacent to a fuel tank, wherein the transverse connection is a fuel tank cover in the lengthwise and vertical directions of the vehicle.

7. Body structure according to claim 3, wherein the transverse connection is located approximately adjacent to a fuel tank, wherein the transverse connection is a fuel tank cover in the lengthwise and vertical directions of the vehicle.

8. Body structure according to claim 4, wherein the transverse connection is located approximately adjacent to a fuel tank, wherein the transverse connection is a fuel tank cover in the lengthwise and vertical directions of the vehicle.

9. Body structure according to claim 1, wherein at least one mounting element in the form of a mounting bushing is integrated by foaming into the transverse connection.

10. Body structure according to claim 2, wherein at least one mounting element in the form of a mounting bushing is integrated by foaming into the transverse connection.

11. Body structure according to claim 3, wherein at least one mounting element in the form of a mounting bushing is integrated by foaming into the transverse connection.

12. Body structure according to claim 5, wherein at least one mounting element in the form of a mounting bushing is integrated by foaming into the transverse connection.

13. Body structure according to claim 8, wherein at least one mounting element in the form of a mounting bushing is integrated by foaming into the transverse connection.

14. Body structure according to claim 1, wherein the transverse connection is made of aluminum foam.

15. A method of making a reinforcement for a self-supporting body of a passenger vehicle, the vehicle body having opposite side walls, comprising:
   foaming lightweight material to form a dimensionally stable one-piece structure, and
   connecting respective opposite ends of the one-piece structure to opposite side walls of the self-supporting vehicle body to form a substantially vertical transverse connection extending substantially over the entire width of the body.

16. A method according to claim 15, wherein said lightweight material is a lightweight metal such as aluminum.

17. A method according to claim 15, wherein said lightweight material is plastic.

18. A method according to claim 15, wherein at least one mounting element in the form of a mounting bushing is integrated by foaming into the transverse connection.

19. A method of making a reinforcement for a self-supporting body of a passenger vehicle, the vehicle body having opposite side walls, comprising:
   foaming lightweight material to form a dimensionally stable one-piece structure, and
   connecting respective opposite ends of the one-piece structure to opposite side walls of the self-supporting vehicle body to form a transverse connection extending substantially over the entire width of the body, wherein the transverse connection comprises a substantially flat wall.

20. A method according to claim 19, wherein said lightweight material is selected from the group consisting of plastic and aluminum.

21. Body structure according to claim 1, wherein the flat transverse wall comprises at least two flat contiguous sections with an angle formed therebetween.

22. Body structure according to claim 1, wherein the flat transverse wall comprises at least three flat contiguous sections with a first angle formed between the first and second section and a second angle formed between the second and third section.

23. Self-supporting body structure for a motor vehicle comprising a motor vehicle body structure having side walls and at least one transverse connection for reinforcing the body structure, wherein the transverse connection comprises a flat transverse wall connected to the side walls, the transverse connection has energy-absorbing ability in the lengthwise direction of the vehicle, the transverse connection is comprised of a dimensionally stable, lightweight material selected from the group of a metal foam and a plastic foam, and the transverse connection extends over the entire width of the body structure,
   wherein the transverse connection is mounted to the motor vehicle body structure in a frame comprising the same material as the transverse connection.

24. Self-supporting body structure for a motor vehicle comprising a motor vehicle body structure having side walls and at least one transverse connection for reinforcing the body structure, wherein the transverse connection comprises a flat transverse wall connected to the side walls, the transverse connection has energy-absorbing ability in the lengthwise direction of the vehicle, the transverse connection is comprised of a dimensionally stable, lightweight material selected from the group of a metal foam and a plastic foam, and the transverse connection extends over the entire width of the body structure,
   wherein the transverse connection is provided with at least one cover layer, the cover layer comprising the same material as the transverse connection, wherein the cover layer does not substantially support the motor vehicle body structure.

25. Body structure according to claim 23, wherein the transverse connection is provided with at least one cover layer, the cover layer comprising the same material as the transverse connection, wherein the cover layer does not substantially support the motor vehicle body structure.

26. Self-supporting body structure for a motor vehicle comprising a motor vehicle body structure having side walls and at least one transverse connection for reinforcing the body structure, wherein the transverse connection comprises a flat transverse wall connected to the side walls, the transverse connection has energy-absorbing ability in the lengthwise direction of the vehicle, the transverse connection is comprised of a dimensionally stable, lightweight material selected from the group of a metal foam and a plastic foam, and the transverse connection extends over the entire width of the body structure,
   wherein the transverse connection is located approximately adjacent to a fuel tank, wherein the transverse connection is a fuel tank cover in the lengthwise and vertical directions of the vehicle.

27. Body structure according to claim 23, wherein the transverse connection is located approximately adjacent to a fuel tank, wherein the transverse connection is a fuel tank cover in the lengthwise and vertical directions of the vehicle.

28. Body structure according to claim 24, wherein the transverse connection is located approximately adjacent to a fuel tank, wherein the transverse connection is a fuel tank cover in the lengthwise and vertical directions of the vehicle.

29. Body structure according to claim 25, wherein the transverse connection is located approximately adjacent to a fuel tank, wherein the transverse connection is a fuel tank cover in the lengthwise and vertical directions of the vehicle.

30. Self-supporting body structure for a motor vehicle comprising a motor vehicle body structure having side walls and at least one transverse connection for reinforcing the body structure, wherein the transverse connection comprises a flat transverse wall connected to the side walls, the transverse connection has energy-absorbing ability in the lengthwise direction of the vehicle, the transverse connection is comprised of a dimensionally stable, lightweight material selected from the group of a metal foam and a plastic foam, and the transverse connection extends over the entire width of the body structure,
   wherein at least one mounting element in the form of a mounting bushing is integrated by foaming into the transverse connection.

31. Body structure according to claim 23, wherein at least one mounting element in the form of a mounting bushing is integrated by foaming into the transverse connection.

32. Body structure according to claim 24, wherein at least one mounting element in the form of a mounting bushing is integrated by foaming into the transverse connection.

33. Body structure according to claim 26, wherein at least one mounting element in the form of a mounting bushing is integrated by foaming into the transverse connection.

34. Body structure according to claim 29, wherein at least one mounting element in the form of a mounting bushing is integrated by foaming into the transverse connection.

35. Self-supporting body structure for a motor vehicle comprising a motor vehicle body structure having side walls and at least one transverse connection for reinforcing the body structure, wherein the transverse connection comprises a flat transverse wall connected to the side walls, the transverse connection has energy-absorbing ability in the lengthwise direction of the vehicle, the transverse connection is comprised of a dimensionally stable, lightweight material which is aluminum, and the transverse connection extends over the entire width of the body structure.

36. A method of making a reinforcement for a self-supporting body of a motor vehicle, the motor vehicle body having opposite side walls, comprising:
    foaming lightweight material to form a dimensionally stable one-piece structure, and
    connecting respective opposite ends of the one-piece structure to opposite side walls of the self-supporting motor vehicle body to form a substantially vertical transverse connection extending substantially over the entire width of the body,
    wherein said lightweight material is a lightweight metal which is aluminum.

37. A method of making a reinforcement for a self-supporting body of a motor vehicle, the motor vehicle body having opposite side walls, comprising:
    foaming lightweight material to form a dimensionally stable one-piece structure, and
    connecting respective opposite ends of the one-piece structure to opposite side walls of the self-supporting motor vehicle body to form a substantially vertical transverse connection extending substantially over the entire width of the body,
    wherein at least one mounting element in the form of a mounting bushing is integrated by foaming into the transverse connection.

38. Self-supporting body structure for a motor vehicle comprising a motor vehicle body structure having side walls and at least one transverse connection for reinforcing the body structure, wherein the transverse connection comprises a flat transverse wall connected to the side walls, the transverse connection has energy-absorbing ability in the lengthwise direction of the vehicle, the transverse connection is comprised of a dimensionally stable, lightweight material selected from the group of a metal foam and a plastic foam, and the transverse connection extends over the entire width of the body structure wherein the flat transverse wall comprises at least two flat contiguous sections with an angle formed therebetween.

39. Self-supporting body structure for a motor vehicle comprising a motor vehicle body structure having side walls and at least one transverse connection for reinforcing the body structure, wherein the transverse connection comprises a flat transverse wall connected to the side walls, the transverse connection has energy-absorbing ability in the lengthwise direction of the vehicle, the transverse connection is comprised of a dimensionally stable, lightweight material selected from the group of a metal foam and a plastic foam, and the transverse connection extends over the entire width of the body structure wherein the flat transverse wall comprises at least three flat contiguous sections with a first angle formed between the first and second section and a second angle formed between the second and third section.

* * * * *